United States Patent [19]
Korus et al.

[11] Patent Number: 6,119,572
[45] Date of Patent: Sep. 19, 2000

[54] DEVICE FOR SEPARATING PACKAGES FOR FLOWABLE MEDIA

[75] Inventors: Bernhard Korus, Darmstadt; Heiko Bub, Bodenheim; Gottfried Pusch, Pfungstadt; Wilhelm Reil, Bensheim, all of Germany

[73] Assignee: Tetra Laval Holdings & Finance S.A., Pully, Sweden

[21] Appl. No.: 08/816,344

[22] PCT Filed: Aug. 3, 1995

[86] PCT No.: PCT/EP95/03087

§ 371 Date: Dec. 22, 1997

§ 102(e) Date: Dec. 22, 1997

[87] PCT Pub. No.: WO96/08349

PCT Pub. Date: Mar. 21, 1996

[30] Foreign Application Priority Data

Sep. 13, 1994 [DE] Germany .............................. 44 32 511

[51] Int. Cl.[7] ...................................................... B26D 11/00
[52] U.S. Cl. .............................. 83/865; 83/425.3; 83/858; 83/914; 83/945; 83/946; 83/952
[58] Field of Search .............................. 83/862, 863, 865, 83/914, 945, 946, 952, 425.3, 425.2, 237, 255, 435.18, 555, 858

[56] References Cited

U.S. PATENT DOCUMENTS

| | | |
|---|---|---|
| 2,732,619 | 1/1956 | Labine ................................... 83/946 X |
| 3,171,452 | 3/1965 | Nyden .................................... 83/255 X |
| 3,377,896 | 4/1968 | De Corta ............................... 83/914 X |
| 3,429,211 | 2/1969 | Pelot ..................................... 83/914 X |
| 3,448,648 | 6/1969 | Magruder et al. .................... 83/914 X |
| 3,759,122 | 9/1973 | Lane et al. ........................... 83/255 X |
| 3,850,354 | 11/1974 | Held, Jr. ............................... 83/914 X |
| 4,015,497 | 4/1977 | Burgess ................................. 83/425.2 |
| 4,058,150 | 11/1977 | Pennington ........................... 83/862 X |
| 4,310,112 | 1/1982 | Huss ..................................... 83/914 X |
| 5,101,703 | 4/1992 | Tanaka et al. ........................ 83/946 X |

FOREIGN PATENT DOCUMENTS 2301774  7/1974  Germany ................................. 83/862

Primary Examiner—Rinaldi I. Rada
Assistant Examiner—Charles Goodman
Attorney, Agent, or Firm—Paul & Paul

[57] ABSTRACT

A device for the mechanical separation of work pieces having plastic material in the area of separation, in particular, packages for flowable media joined together in pairs in the top wall is provided with feed and discharge means with guide rails and drivers and with separating blades arranged on a conveyor belt, with a first linear cutter with cutters arranged in pairs symmetrically with respect to a plane of symmetry, each with straight cutting blades followed by a round cutter with rotatable circular cutters arranged in pairs symmetrically with respect to the plane of symmetry, the cutters with the straight cutting blade being located in the cutting plane perpendicular to the plane of symmetry, and the straight cutting blades being disposed at an angle to the plane of symmetry such that the straight cutting blades get closer together in the conveying direction.

14 Claims, 7 Drawing Sheets

DEVICE FOR SEPARATING PACKAGES FOR FLOWABLE MEDIA

BACKGROUND OF THE INVENTION

1. Field of the Invention

The invention relates to a device for mechanical separation of workpieces having plastic material in the area of separation, in particular packages for flowable media joined together in pairs in the area of the head, with feed and discharge means with guide rails and drivers and with separating cutters arranged on the conveyor belt.

2. Description of the Related Art

It has already been proposed to use an approximately 10 cm long belt provided on one edge with a cutting blade for mechanically separating workpieces, in particular packages for flowable media deep-drawn from plastics material, which belt is moved from one roller past the cutting point to another roller, while the newly manufactured packages for flowable media are conveyed at right angles to the direction of feed of this separating belt. During tests it has been shown that it is very difficult to separate several packages in one operation, although it was indeed possible to use the separating belt provided with teeth for sawing through, but when a smooth blade without teeth was used, separation was particularly difficult when a joining seam or the like which was to be sawn through or cut through was not straight, but instead at the same time had other contours which also had to be separated, for example when cutting has to be done through the middle of an opening means. The precise guiding of the thin separating belt along the cutting plane was problematic. Although the problem of good guiding of the separating blade was recognized and guide cheeks provided, they had to be arranged in a moveable manner and constructed in a costly manner and could not keep the separating belt in the right place along the long path between the two dispensing rollers and guide it continuously and precisely without interruption because of its unstable movements.

BRIEF SUMMARY OF THE INVENTION

The object of the invention is to provide a device of the type described in the introduction, with which a plastics body with a very varied contour can be precisely separated from a corresponding opposite body made from plastics along as smooth a separating surface as possible and largely without deformation of the plastics body.

This object is solved according to the invention in that in the conveying direction of the workpiece a first linear cutter with cutters arranged in pairs symmetrically with respect to a plane of symmetry, each with straight cutting blades, is followed by a round cutter with rotatable circular cutters arranged symmetrically in pairs with respect to the plane of symmetry, that the cutters, each with straight cutting blades, are located in the cutting plane perpendicular to the plane of symmetry and the straight cutting blades are at an angle to the plane of symmetry such that the cutting blades get closer together in the conveying direction. With the device according to the invention, a linear cutter is combined with a round cutter and can be said in this way to share the task of separation. The linear cutter provides the separation of all the surfaces which are located outside the plane of symmetry, while the round cutter cuts where the plastics parts are located in or in the immediate proximity of the plane of symmetry.

The device according to the invention can be used wherever workpieces have plastics material in the area where they have to be separated from one another. For better illustration, however, in the present instance packages for flowable media are described and the device according to the invention is described with reference to the processing thereof, although the invention is clearly not limited to packages. The packages for flowable media described in concrete terms herein are those which are moulded entirely from deep-drawable plastics, and are composed of two halves which are sealed along a common flange or joining seam to form the cavity of the package. There are packages for flowable media of this type in which the pouring aperture is located in the area of the joining seam. If an imaginary plane is projected through the flange or joining seam, which is preferably a sealing seam, and if one looks in the direction of this plane, which for understanding the present invention lies in the plane of symmetry, the pouring aperture is then located between the straight sections of the joining seam, in the form of a circular collar which, for example, can carry an external thread, so that the future package can be sealed after filling by screwing on a screw cap. When looking in the direction of the plane of symmetry one sees, for example, the top wall of a package and in the projection the linear joining seam which is interrupted at one point by the circular collar of the pouring aperture.

It can be imagined that a linear joining seam made from plastics would be relatively easy to cut through without the interruption of the circular collar, wherein the round or straight cutters lie in a cutting plane which intersects the plane of symmetry described along the cutting line.

The difficulty in separating the joining seam described is in the combination of the straight part of the joining seam on the one hand and the round or otherwise contoured part of the joining seam on the other hand, which in the case of the package for flowable media in question are the circular parts of the collar of the pouring aperture. It has indeed been shown that the cutter cannot be used for the straight cut through the straight joining seam without deformation of the collar. However, if a linear cutter is used at the same time as a round cutter, as proposed according to the invention, workpieces can be cut through along joining seams with varied contours. With this it is particularly advantageous to have a paired arrangement of the round cutter on the one hand, in which two circular cutters cooperate, and of the linear cutter, in which a straight cutting blade is assigned in a paired manner to a cutting blade lying opposite, such that although both cutters lie in the cutting plane the two straight lines projected through the blades intersect one another, this being in the conveying direction, behind the cutter. The plane of symmetry is evident as a line between the two cutters, each with a straight cutting blade, and each straight line of the respective cutter projected through the cutting blade is at an angle of between 0° and 90° with respect to the plane of symmetry appearing in the projection as a line.

A linear cutter of this type has proved to be unexpectedly advantageous in the cutting through of the parts of the plastics workpiece which are located outside the plane of symmetry, which in the special embodiment being considered here are the two semi-circular collars above and below the plane of symmetry to be cut through which abut against the straight joining seam at the ends where they merge into one another. For its part the round cutter demonstrates, in an unexpected manner, good cutting properties in the linear area of the joining seam and can no longer deform the arcuate or otherwise contoured area of the plastics wall to be cut if this area is already cut through by the linear cutter.

In this manner plastics bodies with very varied contours can also be precisely mechanically separated from one another. One contour is, for example, the doubled over straight joining seam along a common joining flange of two plastics half-shells joined together. The other of the latterly described very varied contour configurations is the pouring aperture in the area of the top wall, that is to say the cylindrical wall shaped collar of the pouring means, which in plan view appears as a circular collar. The two parts of the linear cutter engage in the two semi-circular collars and separate them. This could be described using the general term "curved part" of the contour, while the round cutter engages in the straight part of the contour of the plastics part, in this case the joining seam. Both separating procedures take place without deformation of the plastics body to be processed, which can be of crucial importance with the pouring means of a package for flowable media. Poor separating surfaces cause problems for the package manufacturer, namely difficulties in the liquid-tight sealing of pouring means. These problems are prevented by means of the measures according to the invention.

It is further advantageous according to the invention when a second linear cutter is arranged in front in the conveying direction of the workpiece, the straight cutting blades of which are set at a lesser angle to the plane of symmetry than the straight blades of the first linear cutter. If two plastics parts, for example two plastics packages moulded by deep-drawing, are to separated from one another, which were joined together at the head—that is to say head-to-head—the first cut is the greatest problem with a separating device of the type described in the introduction. It is therefore advantageous when according to the measure previously described the separating or cutting through of the "curved part" of the contour is not done by one linear cutter but shared between two different linear cutters. The second linear cutter differs from the first in that it firstly engages and does the cutting but preferably only slits or cuts into the surface of the curved part such that the first linear cutter following it only has to continue the cutting and in this way can carry out the separating of the curved contour to the end without deformation. In order to cut through the entire curved contour, the first linear cutter with its straight blades must be at an angle of between 0° and 90° to the plane of symmetry in the manner described above. To initiate the difficult cutting, however, it is advantageous when the second linear cutter has its straight blades at a lesser angle than the first linear cutter. In this way it is ensured that the cut is not made too far into the curved contour and that preferably it remains just a slitting of the surface and provision of the separating line.

It is furthermore advantageous according to the invention when the straight cutting blades of the first linear cutter, being the main cutter, are at an angle of 1° to 20°, preferably of 5° to 15° to the plane of symmetry and that the straight cutting blades of the second linear cutter, being the pre-cutter, are at an angle of 0.5° to 10°, preferably 1° to 5° to the plane of symmetry. Tests have shown that setting the cutting blades of the second linear cutter, being the pre-cutter, at for example 3°, demonstrated very good results when the cutting was initiated, and that the entire curved contour, for example the upper and lower semi-circular collars of the opening means of one workpiece can be completely separated from those of the other workpiece when the blades of the first linear cutter were at less than 8° to the plane of symmetry. Slight deformations of the workpiece manufactured from plastics during the separating procedure are harmless and do not affect a precisely placed cut to the extent that the stress and deformation remains within tolerable limits. It has been shown that in practice, the limits are very narrow and that with normal packages for flowable media the skilled person only needs to use the teaching according to the measures described above to guarantee successful separating lines.

With a further advantageous configuration of the invention the linear cutter and the round cutter are arranged in cutter guides fitted in pairs at a distance apart from one another with respect to the plane of symmetry, wherein preferably in the conveying direction, the rear ends of the second linear cutter lie in the area of the front edges of the first linear cutter, the two circular cutters overlap in the cutting plane, and the overlapping area is arranged at a distance less than the length, preferably half the length, of the straight cutting blades of the first linear cutter from the downstream end of the first linear cutter. Expressed in simple terms, the first linear cutter directly follows on from the second, so that in the area of the curved contour to now be separated the workpiece already comes into engagement with the first linear cutter when other parts of this curved contour are still being held by the second linear cutter. It will be understood that in this way the cutting line is transferred from one station to the next so that the first linear cutter does not have to be applied again or the separating line searched for again.

The two circular cutters which overlap one another in the cutting plane, that is to say in the cutting area where the cutting plane crosses the plane of symmetry, behave in a similar manner. Shearing forces are advantageously produced by means of the overlapping of two circular cutters in the cutting area, which ensure clean separation of a straight cutting seam.

The latter measure, that the area of overlap of the two circular cutters has to be at a certain distance from the adjacent linear cutters provides the advantage that the circular cutters do not have to seek a completely new cutting line on the workpiece, but instead could be said to find a workpiece guided by the first linear cutter so that even with the initial engagement of the circular cutters in the workpiece, the cut is found exactly. Seen from the conveying direction, the downstream end of the first linear cutter is, in other words, the rear end of the linear cutter mentioned above. By means of the angled setting of the blades of the linear cutters, they are close together and provide a good guide for the workpiece when it approaches engagement at the front with the circular cutters. Later on, the separating procedure is less problematic when several workpieces are guided in a string one behind another through the separating device according to the invention. However, even with individual introduction of a workpiece, separation without deformation and with good cut edges is guaranteed by means of the invention.

It is further advantageous according to the invention when the two circular cutters are mounted freely rotating and driveable by means of the workpieces and are provided with razor-blade like, thin smooth blades preferably with a blade thickness of 0.5 to 2 mm, particularly preferably of 1 to 1.5 mm, and when the diameter of each circular cutter is approximately a half to three-quarters of the length of the straight blades of the first linear cutter. The device is particularly simplified and reliable in operation in that the circular cutters do not have to be separately driven. Instead, when being guided past the two circular cutters, the workpieces turn them at a constantly suitable speed. The workpieces are then cleanly cut by the razor-blade-like, thin, circular cutters, and by means of the flat configuration of the cutting blades no dust or plastics granules are produced which could unintentionally end up in the machine or even in the inside of a package for flowable media. The length of the straight blades of the linear cutter is matched to the diameter of the circular cutter such that the first linear cutter always protrudes between two workpieces cut in the area of the domed contour when the round cutter starts the separating procedure. The slit produced by the linear cutter is kept open by this matching of the diameter and the length of the cutters, whereby the workpieces remain precisely retained and orientated from the first to the last separation.

Advantageously according to the invention each cutter guide is configured in as a strip and is provided on the side facing the plane of symmetry with a centering strip of a height less than that of the cutter guide. The strip shape offers the machine constructor good possibilities for assembly and in particular for the arrangement of several cutters in the area of the elongated conveyor path for the workpieces. The plane of symmetry lies centrally between the strip-shaped cutter guides which can be correspondingly configured on the side facing the cut such that not only the cutters are guided, but also the workpieces. In the case of packages for flowable media the centering strip can extend forwards to the cutter guide from both sides in a wedge-shape to the proximity of the cutting point, whereby not only the respective package but also the cutters are guided to the proximity of the point of action. The precision of such a separating device is therefore clearly optimum.

When furthermore according to the invention the second linear cutter has straight blades which are cylindrically ground, or with a toothed contour or the like, the first cutting or slitting of the outer surface of the workpiece is made easier without there being any great risk of conveying remains such as, for example, chippings, into the inside of the package. At the point to be cut first, the domed contour is either closed so that it is ensured that remains cannot fall into the inside of the package, or the first piercing through takes place at the last moment when practically no substantial remains are being produced. At the first cut, the straight cutter practically engages only in the tangential area and immediately carries any chippings produced tangentially away to the outside. By means of the shallow angle, the linear cutter is easily and precisely guided to the correct point for slitting.

It is also advantageous according to the invention when each cutter guide is composed of two parts which can be laid on top of one another with approximately the same covering area, and the circular cutter is covered on the external side facing the plane of symmetry. The assembly of such a cutter guide is convenient and also allows easy dismantling of the separating device as different linear cutters and respectively circular cutters with different diameters are set at different places with respect to the cutting line. In the case of packages with different pouring apertures, in particular with different designs of curved contours, the cutter guides, which also serve as workpiece guides, can be differently configured and suitably easily changed over. In order to match the diameter of the circular cutter, the cutter guide is more or less wide so that the circular cutter remains covered on the external side, so that complete protection is ensured for the operating staff.

It is also advantageous when, according to the invention, the cutter guides and cutters are arranged in the area of movement and action of a first feeder means. The relative movements between the cutters and the workpieces are then produced by means of the drive of this feeder means, with the result that the machine station together with the separating means can remain particularly simply configured. Nevertheless, the separating procedure is adjusted to be exactly synchronous with the movement of the workpieces.

The separating device according to the invention also permits the separating of very differently contoured plastics bodies with modest reconstruction and simple technology. The separation takes place precisely along a line without parts of the plastics body being deformed even when the separating line is not just a straight line but instead also has curved contours. When, in addition, the cutters mainly penetrating through the plastics sections are configured without teeth and without cylindrical grinding, that is to say they have a smooth blade like a razor blade, smooth separating surfaces are also produced, which are advantageous in particular on the pouring devices of packages for flowable media, as usually it is desired that a seal is provided along the circular end edge of the collar of the pouring aperture by means of pressing on a screw cap or the like. The use of the smooth cutter advantageously also prevents the occurrence of remains such as, for example, dust or chippings of plastics material.

The division of the linear cutters into a first cutter following after a second linear cutter ensures that the first cutting or slitting takes place exactly at the correct place as desired and the following linear cutter permits cutting through of the curved contour such that only the straight, unseparated flange seam is fed to the round cutter. Before the engagement of the round cutter with this straight flange seam, the latter is still completely undisturbed and closed. Nevertheless, the sizes and the arrangement of the circular cutter are orientated with respect to the previously arranged linear cutter and matched such that guiding of the workpiece by the linear cutters for exact cutting, and in particular further cutting in the area of the round cutter, is guaranteed. By means of the device according to the invention a precise cut is done in a line in which one station after the other engages.

While deformations in the area of the opening device of a package would lead to interference with functioning in the further manufacturing operation of the package, such deformations can be prevented by means of the measures described according to the invention. With this, sequential welding procedures, screwing procedures and the like can be undertaken with small tolerances so that high quality packages are produced. By means of the advantageous arrangement of both the straight and round cutters it is provided that according to the invention during cutting the resistance is almost zero, resulting in smooth separating surfaces, which are furthermore not deformed. The division into three of the separating procedure is one of the reasons why the resistance on the workpiece is very slight during cutting, even at the place where the first cut takes place, where in general the greatest force engages at a point. The division of the separating procedure into several stations also results in that, advantageously, the workpiece does not have to pass along long paths without guidance. By means of the engagement of the cutters in slits previously made in the workpiece, exact relative positions with respect to the cut can be maintained and they can thereby be guided well and precisely to the correct place.

Further advantages, features and possibilities for application of the present invention will be shown by the following description of a preferred embodiment with reference to the attached drawings.

DETAILED DESCRIPTION OF THE INVENTION

Figure 1:
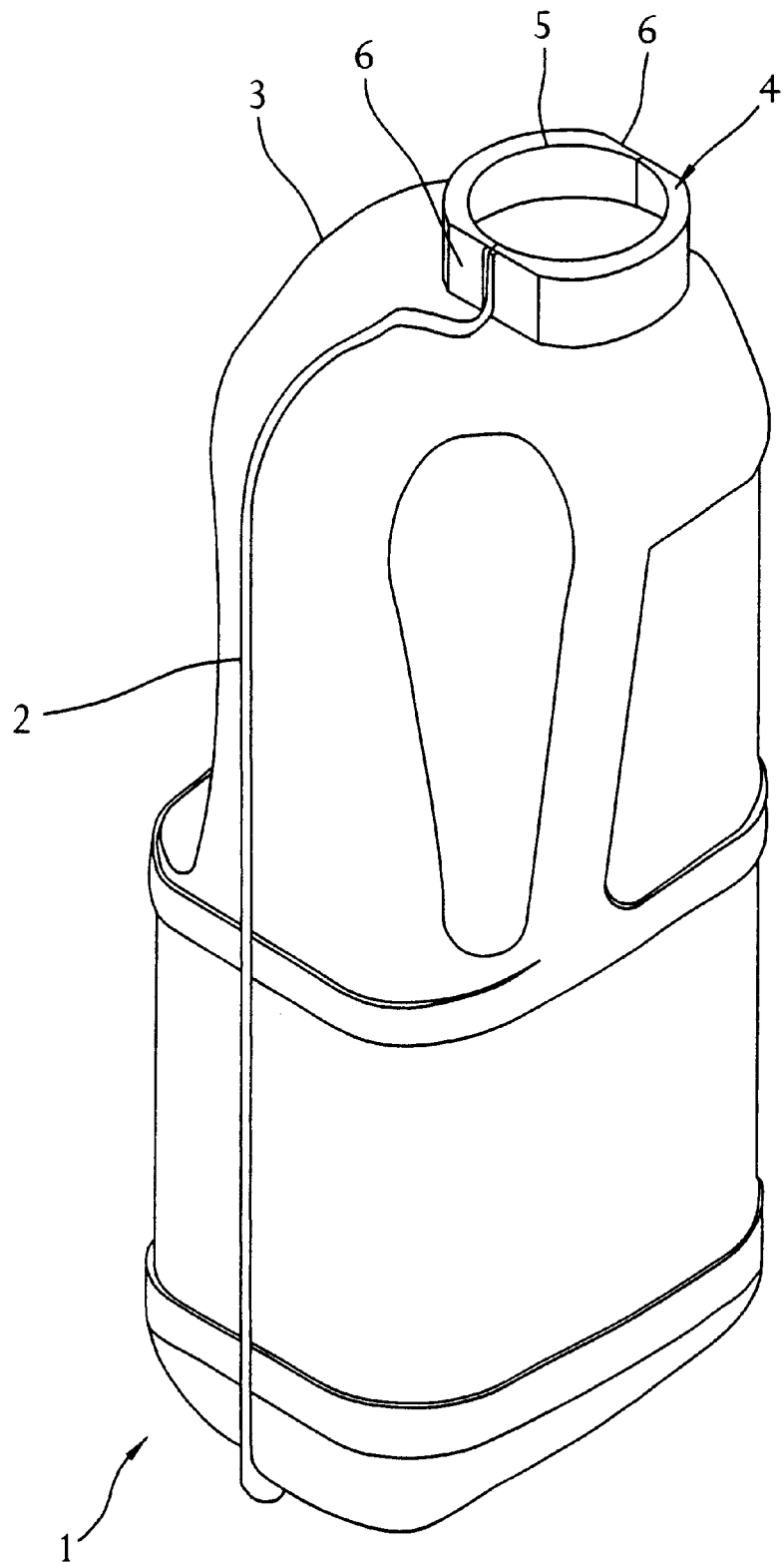
FIG. 1 shows a perspective view of a package for flowable media manufactured by deep-drawing plastics material.
Figure 2:
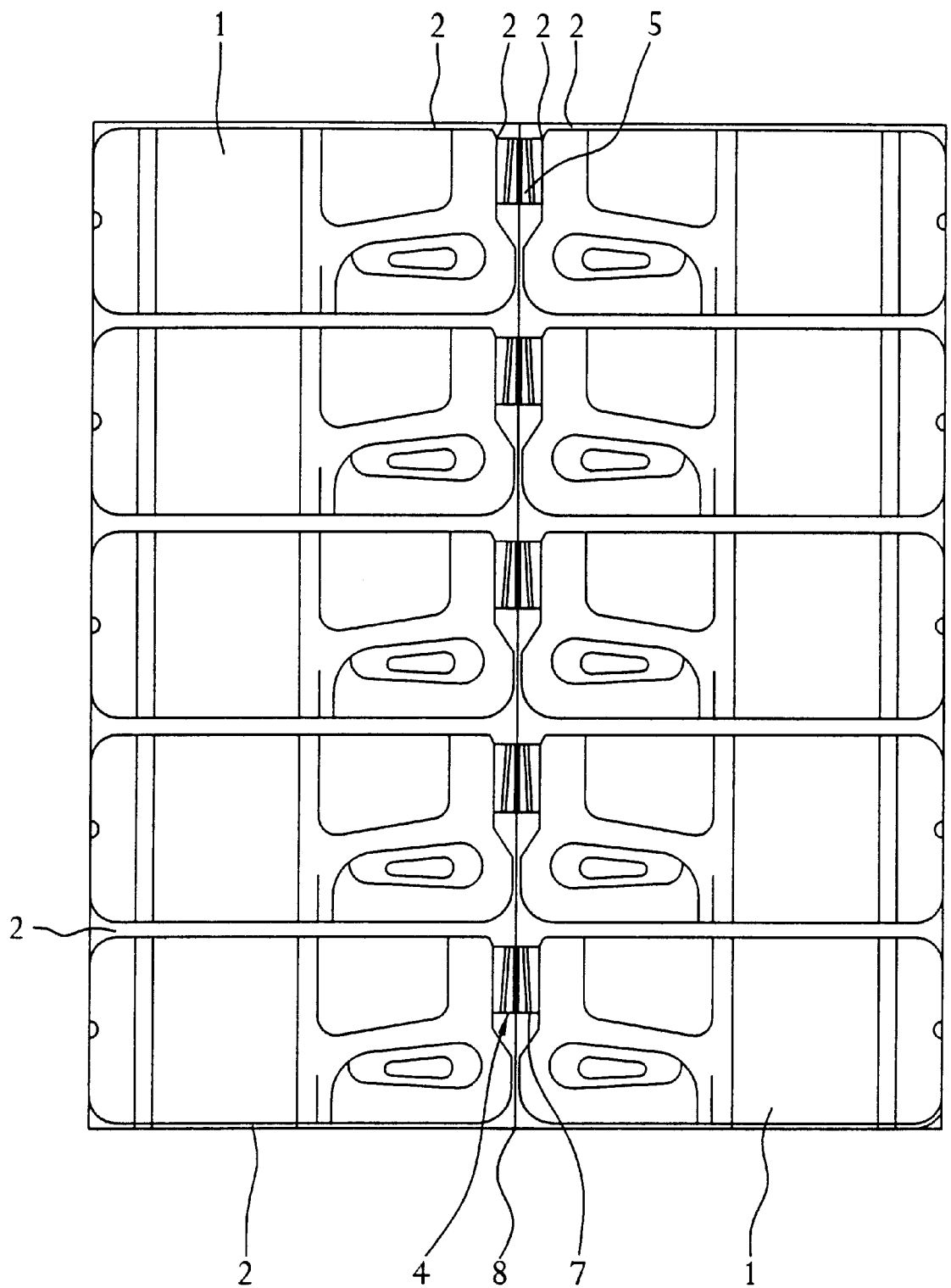
FIG. 2 shows a row of packages of the type shown in FIG. 1 joined together head-to-head in pairs, FIG. 3 a separating device with different feeder means and discharge means, not shown in more detail, in the right-hand part of the drawing.
Figure 3:
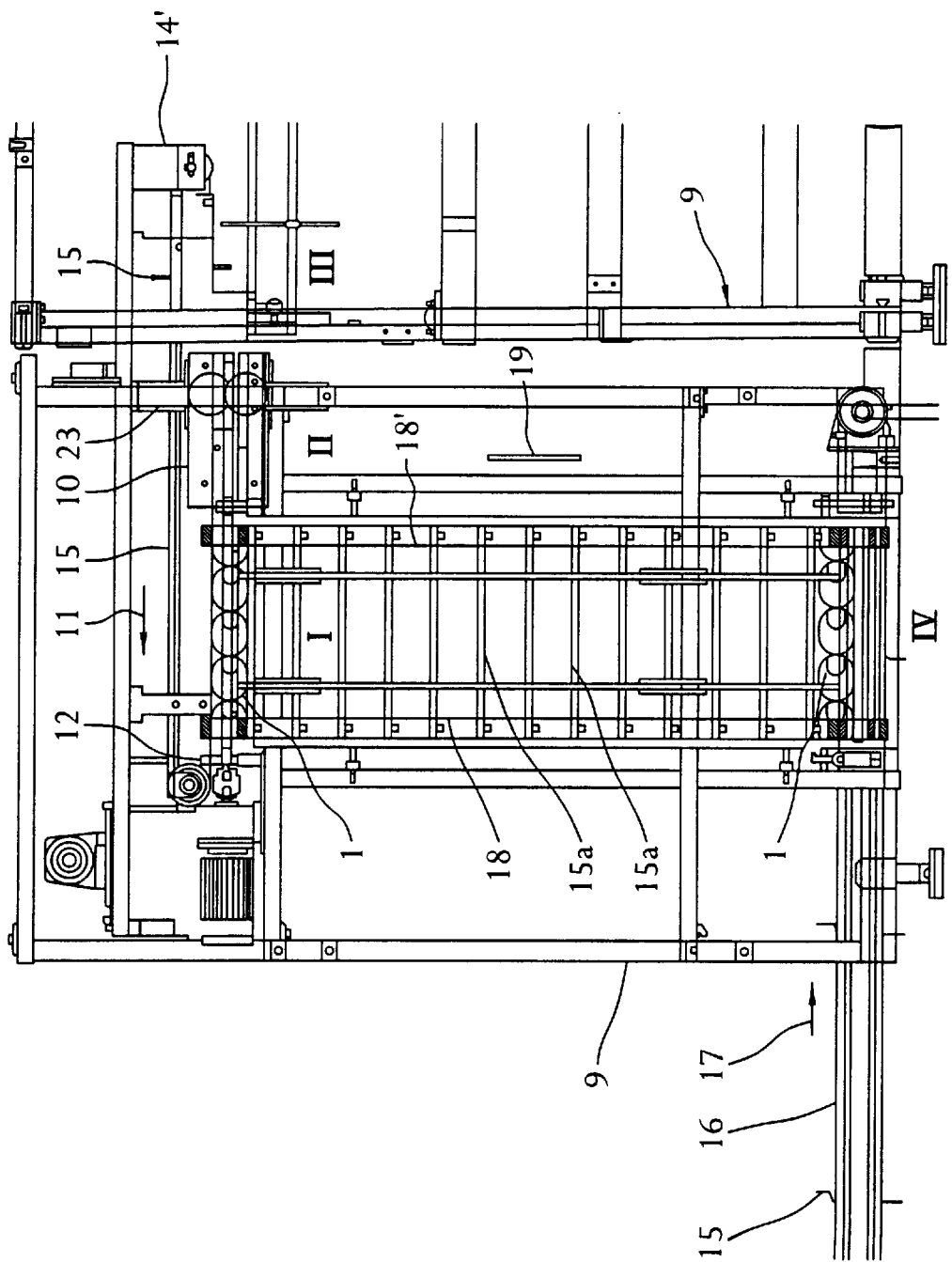
Figure 4:
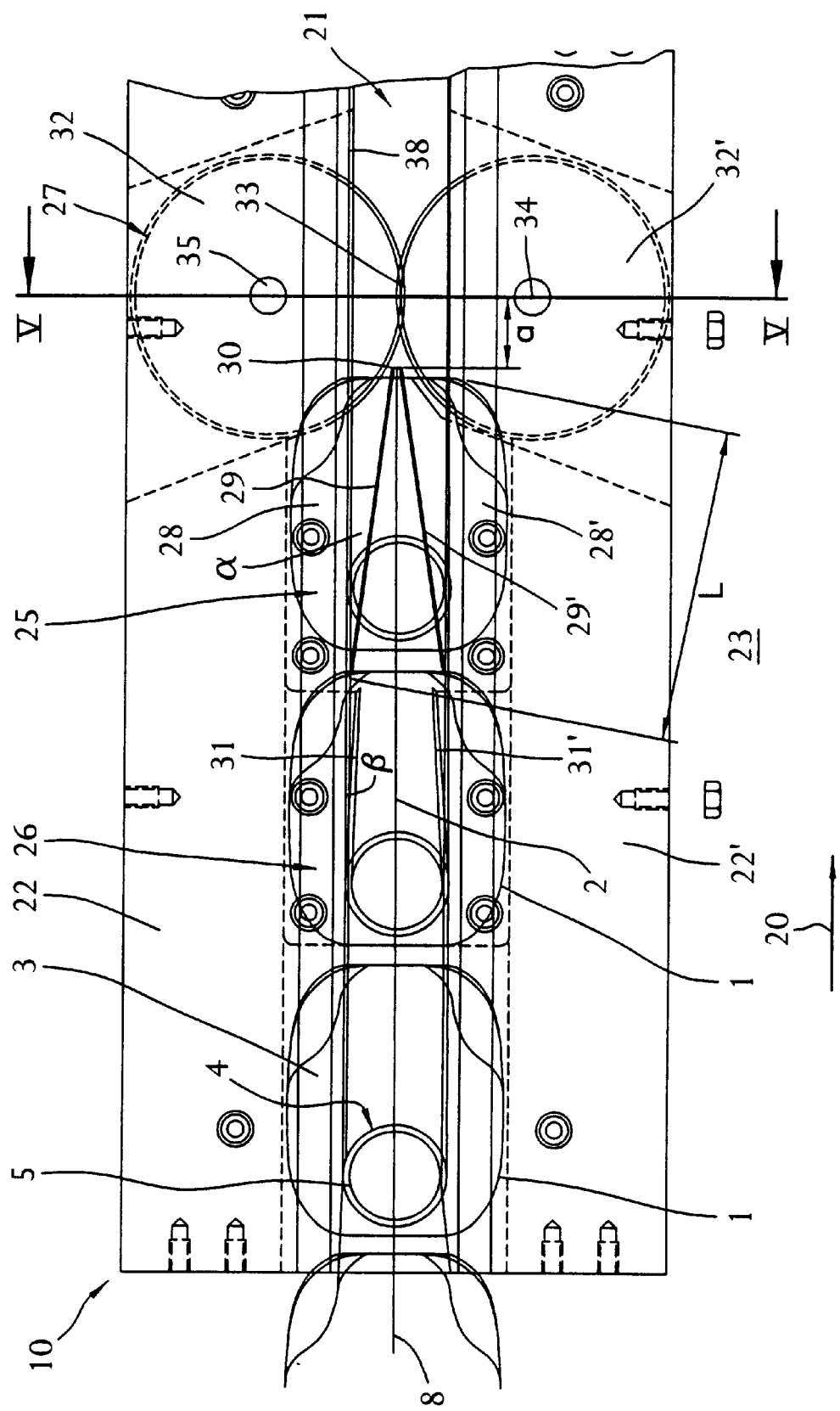
FIG. 4 is an enlarged partial view of the actual separating device from the top center of FIG. 3.
Figure 5:
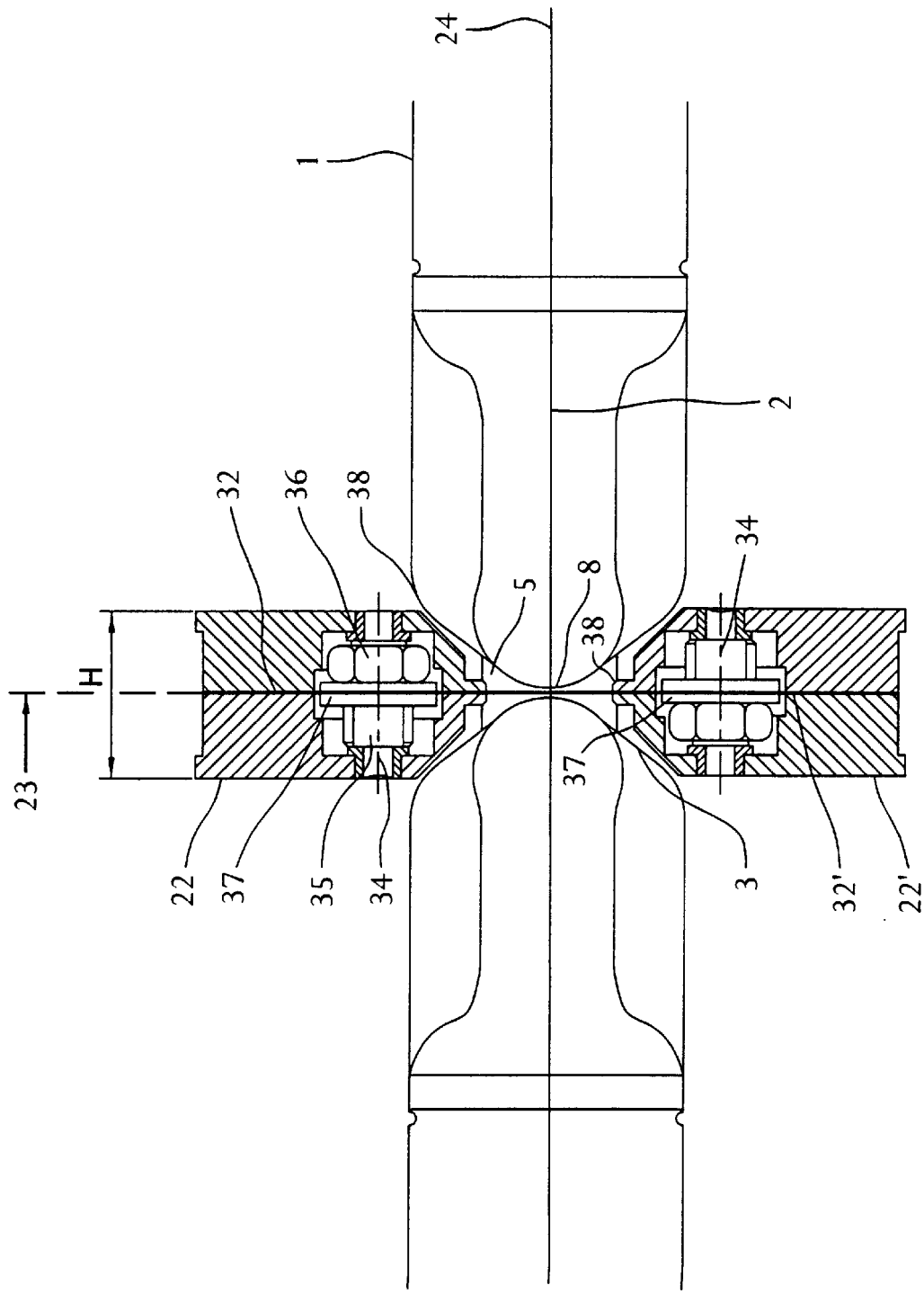
FIG. 5 is a cross-section view along the line V—V of FIG. 4.

FIG. 1 shows a package for flowable media 1 in perspective, which is manufactured by deep-drawing two half-shells from plastics material and by sealing along the flange or joining seam 2. It is to be assumed from the somewhat thicker line in FIG. 1 that the joining seam 2 has been made from the two flange seams of the respective half-shells by sealing. In FIGS. 3, 4 and 5, the joining seam 2 is shown as a simple line. In FIG. 2 the observer looks perpendicularly at the surface of the joining seam 2, which still has both the outer corners and the contoured gusset of the centre of the row of packages, as these have not yet been punched off.

The joining seam 2 surrounds the whole package and therefore also passes through its top wall 3, although it is interrupted there by the pouring means, generally labelled 4.

The pouring means 4 has a collar 5 which is circular in plan view, which prior to sealing of the half-shells is composed of two semi-circular halves. From the exterior, the collar 5 is cylindrically walled with flattened parts 6 in the area of the joining seam 2. The thread 7 indicated in FIG. 2 on the respective collar 5 is not shown in the schematic illustrations of FIGS. 1, 4 and 5. However, in the case of FIGS. 1 and 5, it can easily be imagined.

It is conceivable that each package is manufactured and composed of two half-shells which for their part are deep-drawn from plate-like planar blanks of plastics material. In the case of high-capacity package manufacturing machines, not just one package half is deep-drawn at a time, but instead for example ten package halves are produced in one deep-drawing procedure. In plan view, such a deep-drawn product would then appear as in FIG. 2, wherein the half-shells are joined fastened together head-to-head along the line 8, this line being the future cutting line. The opposite piece of ten corresponding half-dishes is sealed on along the flange seam which later becomes the joining seam 2, so that a double row of five packages one behind another is produced, as shown in FIG. 2. Each of the rows of five packages, arranged in pairs, is composed of one piece and is joined to the adjacent row in the manner shown. FIG. 2 shows the plan view of ten completely sealed packages. The interior of each pair of packages 1 is joined by means of the collars 5, attached to one another, of the pouring means 4. The part shown in FIG. 2 is thus the workpiece in which the separating cut is to be made along the line 8.

This workpiece (package 1) or the strings of packages 1 is fed by means of feeder means, which can be described with reference to FIG. 3, to the separating means shown at the top center in FIG. 3 and shown actual and enlarged in FIG. 4.

The separating means, generally labelled 10, is fitted onto the base frame 9, said separating means being with a first conveyor belt 12 circulating in the direction of the arrow 11 at the top (top belt). This is driven by the motor 13 in an anti-clockwise direction around two guide rollers 14, 14' and, in the direction of view, at right-angles to the conveying direction carries L-shaped drivers 15 which are arranged equally spaced apart and matched to the string of packages. The string of five pairs of packages 1 is shown at the top of FIG. 3 such that a driver 15 engages between the package 1 furthest at the front in the conveying direction, that is to say the package arranged furthest to the right, and the second package behind it, in order to displace the packages intermittently to the right, as the drive motor 13 drives the so-called first conveyor means 12 such that the row of packages 1 on the bottom belt is transported to the right from the position I (FIG. 3) into position II with the separating device 10 and from there further to the position III.

It is firstly assumed that the row of packages arranged in pairs on top of one another, as shown in plane view in FIG. 2, are brought on the feeder 16 with its drivers 15 to the right in the direction of the arrow 17 into the position IV, as shown in FIG. 3 in the centre at the bottom. Here, the string of packages 1 is displaced at right-angles to the paper in the direction of view in FIG. 3 towards the rear (or forwards) on drivers 15a which extend horizontally between two transport belts 18, 18' extending vertically and intermittently displaced vertically upwards in the arrow of the arrow 19 as far as position I, which is again shown in the center of FIG. 3 at the top, with the row of packages 1. For better understanding, the packages 1 with circular collars 5 on the top wall 3 are shown as in FIG. 4, that is to say when viewed in the direction of the axis of the cylinder of the collar 5 towards the top wall 3 of the package 1.

The packages 1 are displaced from position I on guide rails which extend horizontally from position I as far as position II, or the drivers 15a are used as such guide rails as they remain standing after the intermittent movement until the packages 1 located in position I are conveyed in the conveying direction 20 over to the right into the separating device 10 (position II). Here, the cutting procedure starts, as will be described hereinafter. At the downstream end of the separating device 10, on the right, the front pair of the row of packages has already been separated, and when, with the next stroke horizontally to the right out of position II, the row of packages arrives in position III, all the pairs of packages 1 are separated along the cutting line 8 according to FIG. 2, so that there are two rows, each of five open packages. From there, that is to say from position III, the packages are further moved by discharging conveyor means (not shown) for further treatment.

FIG. 4 most clearly shows the separating device 10. This shows the long conveyor belt generally labelled 21 between two strip-shaped cutter guides 22, 22' which are screwed stationarily onto the base frame 9 with angled pieces 23 (FIG. 3). Centrally in the conveyor belt 21 is the cutting line 8, which in FIG. 4 is shown on the left with the reference number 8, which lies in the joining seam 2. In FIG. 4, the plane of symmetry 24 is perpendicular to the plane of the paper which is also the cutting plane 23 (FIG. 5). The two planes latterly described are indicated in FIG. 5 by dashed lines and intersect in the cutting line 8, which is the central crossing point in FIG. 5.

In the area of the conveyor belt 21 of the workpiece or package 1, on each of the cutter guides 22, 22' arranged in pairs there is a first linear cutter 25 and in front of this in the conveying direction 20, a second linear cutter 26, and following after the first linear cutter 25 there is arranged a round cutter 27.

The first linear cutter 25 is provided with a pair of cutters 28, 28' which each have a straight blade 29, 29'. These cutters 28, 28' lie in the cutting plane 23 perpendicular to the plane of symmetry 24, that is to say parallel to the plane of the paper in FIG. 4, and parallel to said Figure, and the straight cutting blades 29, 29' are at an angle α of 8° to the plane of symmetry 24. The straight cutting blades 29, 29' run from left to right in the conveying direction 20 in FIG. 4, getting closer to one another such that their rear, or downstream, ends 30 are close enough together that essentially only the joining seam 2 can pass between them in the conveying direction 20 without engagement of cutters.

A second linear cutter 26 is arranged in the conveying direction 20 of the packages 1 as a pre-cutter, the straight cutting blades 31, 31' of which are at an angle β=3° to the plane of symmetry 24. The angle β is half the size, if not even smaller, than the angle α at which the straight cutting blades 29, 29' of the first linear cutter are set with respect to the plane of symmetry 25.

The round cutter 27 is arranged following after the first linear cutter 25 in the conveying direction 20, which round cutter is provided with two freely rotating circular cutters 32, 32' symmetrical to the plane of symmetry 24. They overlap in the area 33 which is arranged at a distance a from the downstream end 30 of the first linear cutter 25. This distance a is smaller than half the length L of the straight cutting line 29, 29' of the first linear cutter 25.

According to the illustration in FIG. 5, each circular cutter 32, 32' is mounted on the axle 34 with journals 35 in the two-part cutter guide 22, 22' respectively and retained by means of the nut 36 over spring washers 37.

The diameter of each circular cutter 32, 32' is approximately ⅘ of the length L of the straight blade 29, 29' of the first linear cutter 25.

FIG. 5 shows the external cylindrical walled surface of the collars 5 of the respective packages 1, which are arranged here head-to-head adjacently in the horizontal direction such that the plane projected through the flanged sealing seam 2 lies in the plane of symmetry 24. Each of the strip-like, two-part cutter guides 22, 22' is configured V-shaped in the area adjacent to the cutting line 8 in the cross-section according to FIG. 5, so that the respective cutter, in this case the circular cutter 32, 32' respectively is guided as close as possible to the cutting line 8. In order to optimize this guiding, a centring strip 38 is fitted on the side of each cutter guide 22, 22' facing the plane of symmetry 24. It can be seen from FIG. 4 that this extends over approximately the same length as the respective cutter guide 22, 22'. Compared to the total height H of the cutter guide 22, 22' the height of the centring strip 38, not described in more detail, is substantially smaller by a size ratio of approximately 10:1 to 5:1, preferably in the embodiment according to FIG. 5 of 6:1.

In operation the package 1 at the front, shown furthest to the right in FIG. 4, is displaced in the conveyor belt 21 such that the sloped cheeks and the central strip 38 of the cutter guides 22 and 22' guides the pair of packages 1 lying head-to-head opposite one another in a sliding manner (comparable to the position in FIG. 5). When moved forward in the conveying direction 20, this first package reaches the position shown completely in FIG. 4 at the left within the cutter guides 22, 22'. The circular collar 5 of the pouring means 4 of the package 1 is then retained in the centring strip 38 and guided into the central position shown in FIG. 4. Here, the first slit is made by the straight cutting blades 31, 31' of the pre-cutter 26. The rear ends of this result in a small cut through the cylindrical wall of the collar 5 in which the straight cutters 29, 29' of the first linear cutter 25, set in a V-shape, engage in order to continue the cut during further movement in the conveying direction 20 and to carry this out until reaching the rear end 30 of this latterly described cutting blade 29, 29'. Here, the entire cylindrical wall of the collar 5 is cut through and only the straight joining seam 2 has still remained outside engagement with the cutters. The circular cutters 32, 32' produce the straight cut along the line 8 in the joining seam 2 and meet in the slit of the separated collar 5 kept open by the cutters 28, 28', so that during further movement of the package in the conveying direction 20 they can continue from there with the straight cut through the joining seam 2 behind the collar 5. In this manner one pair of packages after another is separated and moved on to the right in the conveying direction 20. The movement of a string of packages in the conveying direction 20 is done until the last pair of packages is separated. The rest position of the intermittent movement then follows, and so forth.

Figure 6:
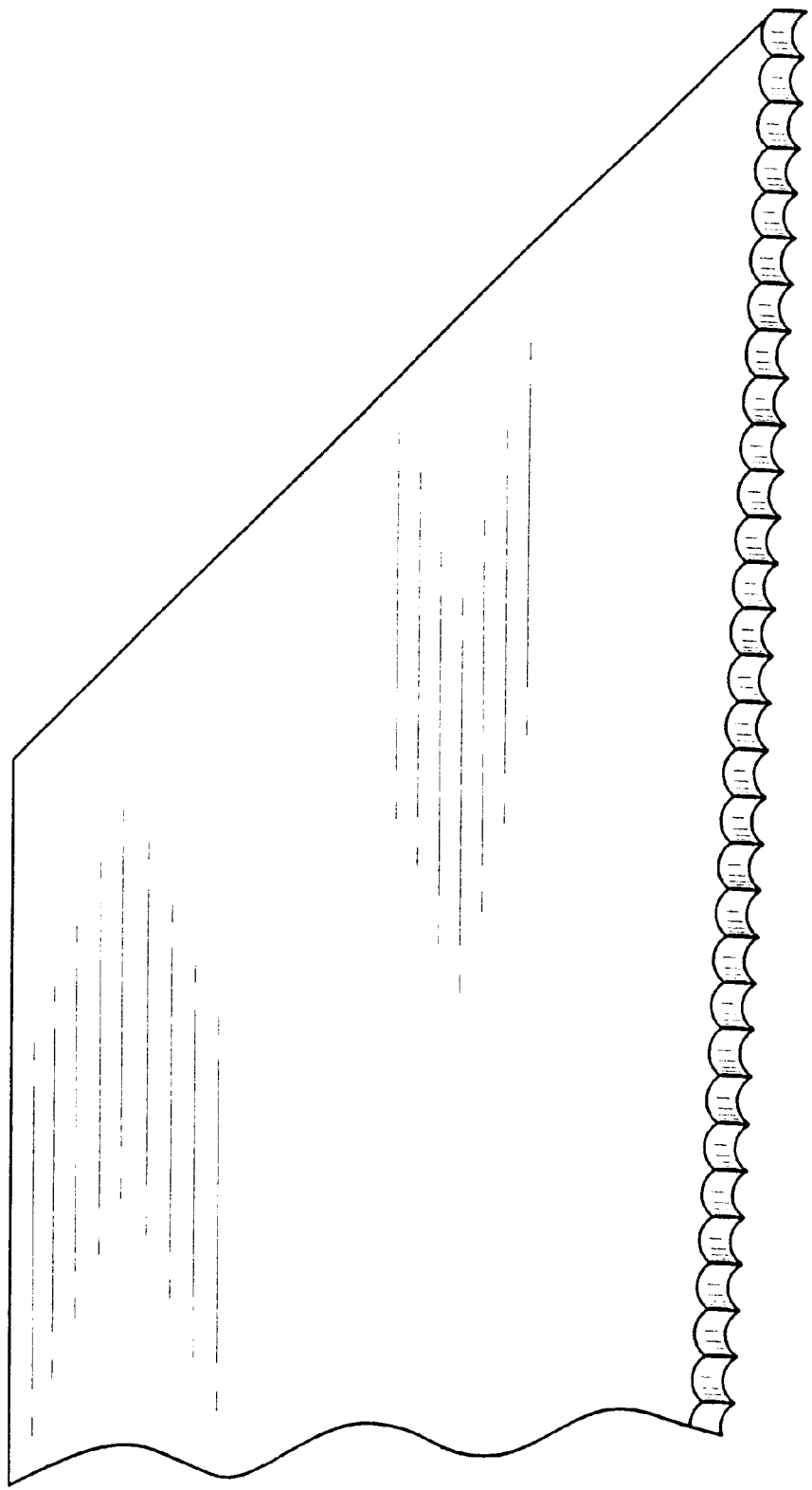
FIG. 6 is a perspective new of a portion of a straight blade 31" with a cylindrical grinding.
Figure 7:
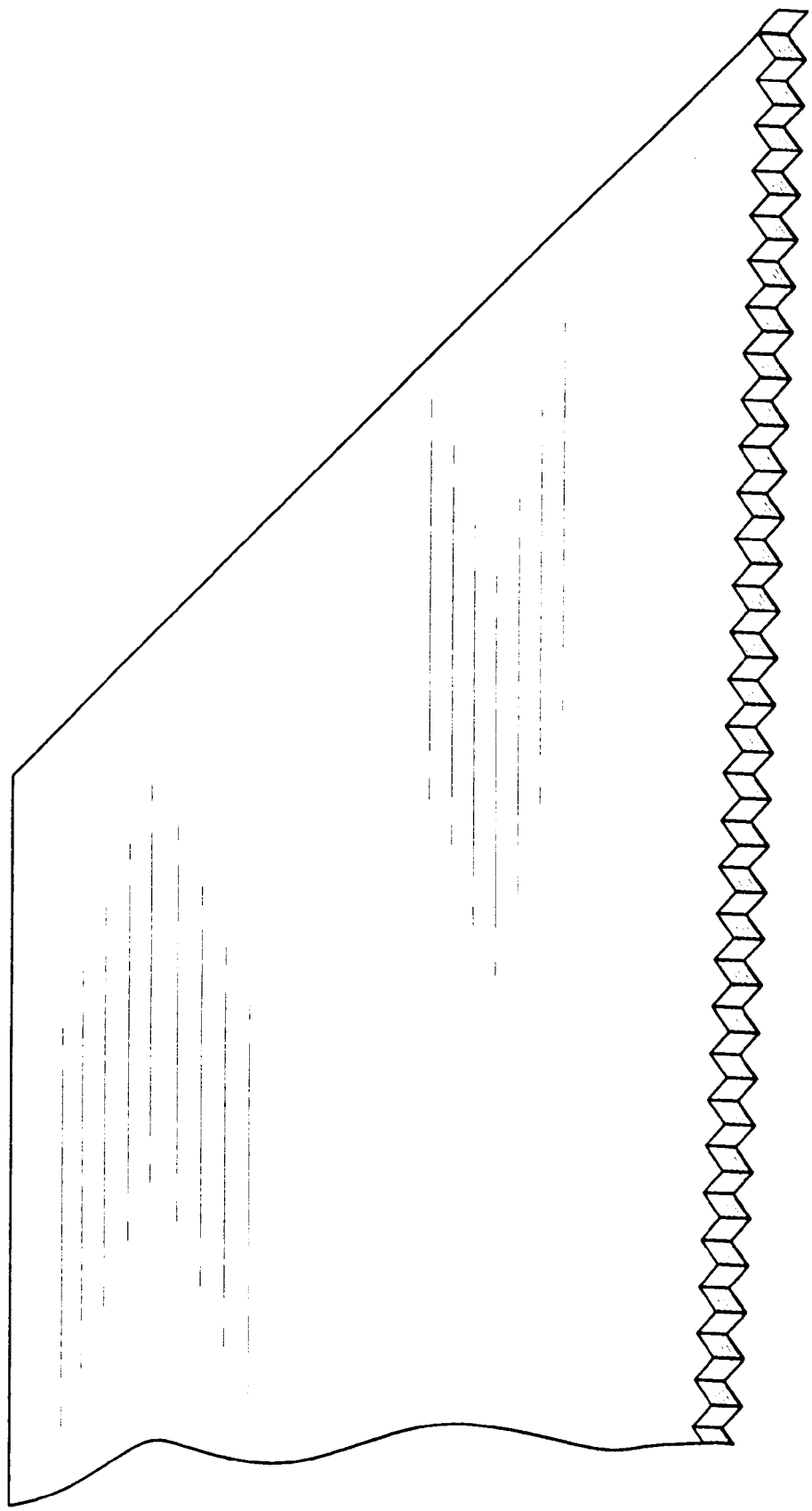
FIG. 7 is a perspective view of a portion of a straight blade 31'" having a toothed contour.

Alternate straight cutting blade edges are shown in FIGS. 6 and 7 wherein alternate blade edge configurations, such as the straight blade with cylindrical grinding 31" (FIG. 6) and the straight blade with a toothed contour 31''' (FIG. 7) are shown.

| List of designations | |
|---|---|
| 1 | package for flowable media |
| 2 | flange and joining seam |
| 3 | top wall |
| 4 | pouring means |
| 5 | collar |
| 6 | flattened part |
| 7 | thread |
| 8 | line |
| 9 | base frame |
| 10 | separating device |
| 11 | arrow |
| 12 | conveyor belt |
| 13 | motor |
| 14, 14' | guide wheels |
| 15, 15a | drivers |
| 16 | feeder |
| 17 | arrow |
| 18, 18' | transport belts |
| 19 | arrow |
| 20 | conveying direction |
| 21 | conveying path |
| 22, 22' | cutter guides |
| 23 | angled piece, cutting plane |
| 24 | plane of symmetry |
| 25, 26 | linear cutter |
| 27 | round cutter |
| 28, 28' | cutter |
| 29, 29' | cutting blades |
| 30 | ends |
| 31, 31' | cutting blades |
| 32, 32' | circular cutter |
| 33 | area |
| 34 | axle |
| 35 | journal |
| 36 | nut |
| 37 | spring washer |
| 38 | centering ridge |
| a | distance |
| H | total height |
| I | position |

-continued

List of designations

| | |
|---|---|
| II | position |
| III | position |
| IV | position |
| L | length |

What is claimed is:

1. A device for mechanical separation of work pieces which comprise hollow plastic packages joined together at one end thereof to define a zone of separation in pairs, said device comprising: feeder means for feeding work pieces along a path of travel, said feeder means including conveyor means with guiderails and drivers, wherein the conveyor means includes at least one conveyor belt and separating cutters disposed along said conveyor belt along said path of travel said separating cutters including a first linear cutter having a pair of cutters arranged on opposite sides with respect to a first plane of symmetry, which is longitudinal in relation to said path of travel, said cutters each having at least one straight cutting blade disposed for location in a cutting plane, said cutting plane being perpendicular to the first plane of symmetry, said straight cutting blades being disposed at an angle relative to the first plane of symmetry, wherein said straight cutting blades converge along the path of travel; said device further including a round cutter arranged along the path of travel downstream from said first linear cutter, said round cutter having a pair of rotatable circular cutters arranged symmetrically on opposite sides with respect to said first plane of symmetry.

2. The device according to claim 1, further including cutter guides disposed along said path of travel, wherein a first cutter guide is disposed on one side of the path of travel and a second cutter guide is disposed on the other side of the path of travel, said cutter guides being disposed on opposite sides of said first plane of symmetry, wherein said first cutter guide carries one of said pair of cutters of said first linear cutter and one of said pair of rotatable circular cutters of said round cutter, wherein said second cutter guide carries the other of said pair of cutters of said first linear cutter and the other of said pair of rotatable circular cutters of said round cutter, wherein a second linear cutter is disposed along the path of travel upstream relative to the first linear cutter, such that work pieces engage said second linear cutter prior to engaging said first linear cutter, and wherein said second linear cutter overlaps longitudinally with said first linear cutter and wherein said rotatable circular cutters overlap said first plane of symmetry, said circular cutters being disposed to overlap at a distance relative to the path of travel which is less than a predetermined length of said straight blades, said overlap occurring at a location downstream of said first linear cutter.

3. The device according to claim 2, wherein each of said first and second cutter guide comprises a first part and a second part, said second part adapted to be placed on top of said first part to form said cutter guide, wherein each of said first and second cutter guides has one side facing said first plane of symmetry and another side facing away from said first plane of symmetry, wherein each of said first and second cutter guides partially covers one of the pair of said circular cutters, wherein said circular cutters are fully covered on said side of said first and second cutter guides facing away from the first plane of symmetry and wherein said circular cutters are exposed on the side of said first and second cutter guides facing said plane of symmetry.

4. A device for mechanical separation of work pieces which comprise hollow plastic packages joined together in pairs at one end thereof to define a zone of separation, said device comprising: feeder means for feeding work pieces along a path of travel, said feeder means including conveyor means with guiderails for guiding said work pieces and drivers for moving said work pieces along said path of travel, wherein the conveyor means includes at least one conveyor belt and separating cutter means disposed along said conveyor belt along said path of travel, said separating cutter means including a first linear cutter having a pair of cutters arranged on opposite sides with respect to a first plane of symmetry, which is longitudinal in relation to said path of travel, said cutters each having at least one straight cutting blade disposed for location in a cutting plane, said cutting plane being perpendicular to the first plane of symmetry, said straight cutting blades being disposed at a first angle relative to the first plane of symmetry, wherein said straight cutting blades have a predetermined length and converge in the direction of the path of travel; said device further including a round cutter arranged along the path of travel following said first linear cutter, said round cutter having a pair of rotatable circular cutters arranged symmetrically on opposite sides with respect to said first plane of symmetry; wherein a second linear cutter is disposed along the path of travel upstream relative to the first linear cutter such that work pieces engage said second linear cutter prior to engaging said first linear cutter, said second linear cutter including a pair of cutting blades disposed on opposite sides of the first plane of symmetry at a second angle relative to the plane of symmetry, such that said second angle is smaller than said first angle.

5. The device according to claim 4, wherein said first angle is between about 5° to about 15° relative to the first plane of symmetry and wherein said second angle is about 1° to about 5° relative to the first plane of symmetry.

6. The device according to claim 4, further including cutter guides disposed along said path of travel, wherein a first cutter guide is disposed on one side of the path of travel and a second cutter guide is disposed on the other side of the path of travel, said cutter guides being disposed on opposite sides of said first plane of symmetry, wherein said first cutter guide carries one of said pair of cutters of said first linear cutter and one of said pair of rotatable circular cutters of said round cutter, wherein said second cutter guide carries the other of said pair of cutters of said first linear cutter and the other of said pair of rotatable circular cutters of said round cutter, wherein said second linear cutter overlaps longitudinally with said first linear cutter and wherein said rotatable circular cutters overlap said first plane of symmetry, said circular cutters being disposed to overlap at a location downstream of said first linear cutter.

7. The device according to claim 6, wherein each of said first and second cutter guides comprises a first part and a second part, said second part adapted to be placed on top of said first part to form said cutter guide, and wherein each of said first and second cutter guides partially covers one of the pair of said circular cutters, wherein each of said first and second cutter guides has one side facing said first plane of symmetry and another side facing away from said first plane of symmetry, wherein said circular cutters are fully covered on said side of said cutter guide facing away from the first plane of symmetry and wherein said circular cutters are exposed on the side of said first and second cutter guides facing said plane of symmetry.

8. The device according to any one of claim 6 or 2, wherein said cutter guides, said cutters of said first linear cutter, said cutting blades of said second linear cutter and said rotatable circular cutters of said round cutter are arranged along the path of travel of said at least one conveyor belt of said feeder means.

9. The device according to claim 4, including first and second cutter guides wherein each of said first and second cutter guides is configured as a centering strip disposed on each side of the first plane of symmetry and facing said first plane of symmetry, said centering strip being of a height less than that of each respective first and second cutter guides.

10. The device according to claim 4, wherein said circular cutters are defined by a diameter and are rotatably mounted for engagement with work pieces, said circular cutters having thin blades with a blade thickness of approximately 0.5 to 2 mm, and wherein the diameter of each circular cutter is approximately ½ to ⅚ said predetermined length of said straight blades of said first linear cutter.

11. The device according to claim 4, wherein said second linear cutter cutting blades are straight blades having one or the other of a cylindrical grinding and a tooth contour.

12. The device according to claim 4, wherein said first angle is between about 5° to about 15° relative to the first plane of symmetry and wherein said second angle is about 1° to about 5° relative to the first plane of symmetry.

13. A device for mechanical separation of work pieces which comprise hollow plastic packages joined together in pairs at one end thereof to define a zone of separation, said device comprising: feeder means for feeding work pieces along a path of travel, said feeder means including conveyor means with guiderails and drivers, wherein the conveyor means includes at least one conveyor belt and separating cutters disposed along said conveyor belt along said path of travel, said separating cutters including a first linear cutter having a pair of cutters arranged on opposite sides with respect to a first plane of symmetry, which is longitudinal in relation to said path of travel, said cutters each having at least one straight cutting blade disposed for location in a cutting plane, said cutting plane being perpendicular to the first plane of symmetry, said straight cutting blades being disposed at an angle relative to the first plane of symmetry, wherein said straight cutting blades converge along the path of travel; said device further including a round cutter arranged along the path of travel downstream from said first linear cutter, said round cutter having a pair of rotatable circular cutters arranged symmetrically on opposite sides with respect to said first plane of symmetry, and including a first cutter guide disposed on one side of the path of travel and a second cutter guide disposed on the other side of the path of travel, wherein each of said first and second cutter guides comprises a first part and a second part, said second part adapted to be placed on top of said first part to form one of said first and second cutter guides, and wherein each of said first and second cutter guides partially covers one of the pair of said circular cutters, wherein each of said first and second cutter guides has one side facing said first plane of symmetry and another side facing away from said first plane of symmetry, wherein said circular cutters are fully covered on said side of said cutter guide facing away from the first plane of symmetry and wherein said circular cutters are exposed on the side of each of said first and second cutter guides facing said plane of symmetry.

14. A device for mechanical separation of work pieces which comprise hollow plastic packages joined together in pairs at one end thereof to define a zone of separation, said device comprising: feeder means for feeding work pieces along a path of travel, said feeder means including conveyor means with guiderails and drivers, wherein the conveyor means includes at least one conveyor belt and separating cutters disposed along said conveyor belt along said path of travel, said separating cutters including a first linear cutter having a pair of cutters arranged on opposite sides with respect to a first plane of symmetry, which is longitudinal in relation to said path of travel, said cutters each having at least one straight cutting blade disposed for location in a cutting plane, said cutting plane being perpendicular to the first plane of symmetry, said straight cutting blades being disposed at an angle relative to the first plane of symmetry, wherein said straight cutting blades converge in the direction of the path of travel; said device further including a round cutter arranged along the path of travel downstream from said first linear cutter, said round cutter having a pair of rotatable circular cutters arranged symmetrically on opposite sides with respect to said first plane of symmetry, wherein said circular cutters are rotatably mounted for engagement with work pieces, said circular cutters having thin blades with a blade thickness of approximately 0.5 to 2 mm, and wherein the diameter of each circular cutter is approximately ½ to ⅚ the length of said straight blades of said first linear cutter.

* * * * *